United States Patent [19]

Fulmer et al.

[11] Patent Number: 4,972,873

[45] Date of Patent: Nov. 27, 1990

[54] SHUTTLE VALVE WITH SPIKE-APPLY DAMPING

[75] Inventors: Keith H. Fulmer, Mishawaka; Gamil M. Rizk, South Bend, both of Ind.

[73] Assignee: Allied-Signal Inc., Morristown, N.J.

[21] Appl. No.: 369,385

[22] Filed: Jun. 21, 1989

[51] Int. Cl.⁵ .......................................... G05D 16/10
[52] U.S. Cl. .............................. 137/505.13; 137/87; 303/84.1
[58] Field of Search ................ 137/110, 505.13, 87; 303/84.1, 84.2, 68, 9.71; 251/15

[56] References Cited

U.S. PATENT DOCUMENTS

| | | | |
|---|---|---|---|
| 2,970,607 | 2/1961 | Peck et al. | 251/15 X |
| 3,184,211 | 5/1965 | Chapman et al. | 251/15 |
| 4,191,210 | 3/1980 | Belart et al. | 137/505.13 |
| 4,220,376 | 9/1980 | Spero | 303/87 |
| 4,694,649 | 9/1987 | Howeth | 137/505.13 X |

FOREIGN PATENT DOCUMENTS 2549569  1/1985  France .................. 251/15

Primary Examiner—Stephen M. Hepperle
Attorney, Agent, or Firm—Leo H. McCormick, Jr.; Ken C. Decker

[57] ABSTRACT

The shuttle valve (10) has a valve member (30) which includes first (32) and second (36) diameter sections disposed within small diameter (22), reduced diameter (24), and enlarged diameter (26) bore sections of a stepped bore (14) located in a valve body (12). The small diameter bore section (22) communicates with a brake feedback line connection (20), the reduced diameter bore section (24) communicates with an outlet opening (40), and the enlarged diameter bore section (26) communicates with an inlet opening (50). The second diameter section (36) of the valve member (30) includes a transverse opening (44) which communicates with a longitudinal orifice opening (46) that leads to a chamber (48) located at an end of the valve member (30). Seals (60, 70) are disposed about the first and second diameter sections (32, 36), and the valve member (30) biased by a spring (80) toward an at-rest position. Located about the first diameter section (32) of the valve member (30) is a freely movable orifice member (90) which includes a radial orifice opening (94) at one surface thereof. The sudden communication of high fluid pressure through the inlet opening (50) results in a slightly delayed displacement of the valve member (30) and movable orifice member (90), and the displacement of the valve member (30) and movable orifice member (90) then causing fluid to be communicated through the movable orifice opening (94) so that fluid communication with the outlet opening (40) is restricted.

12 Claims, 1 Drawing Sheet

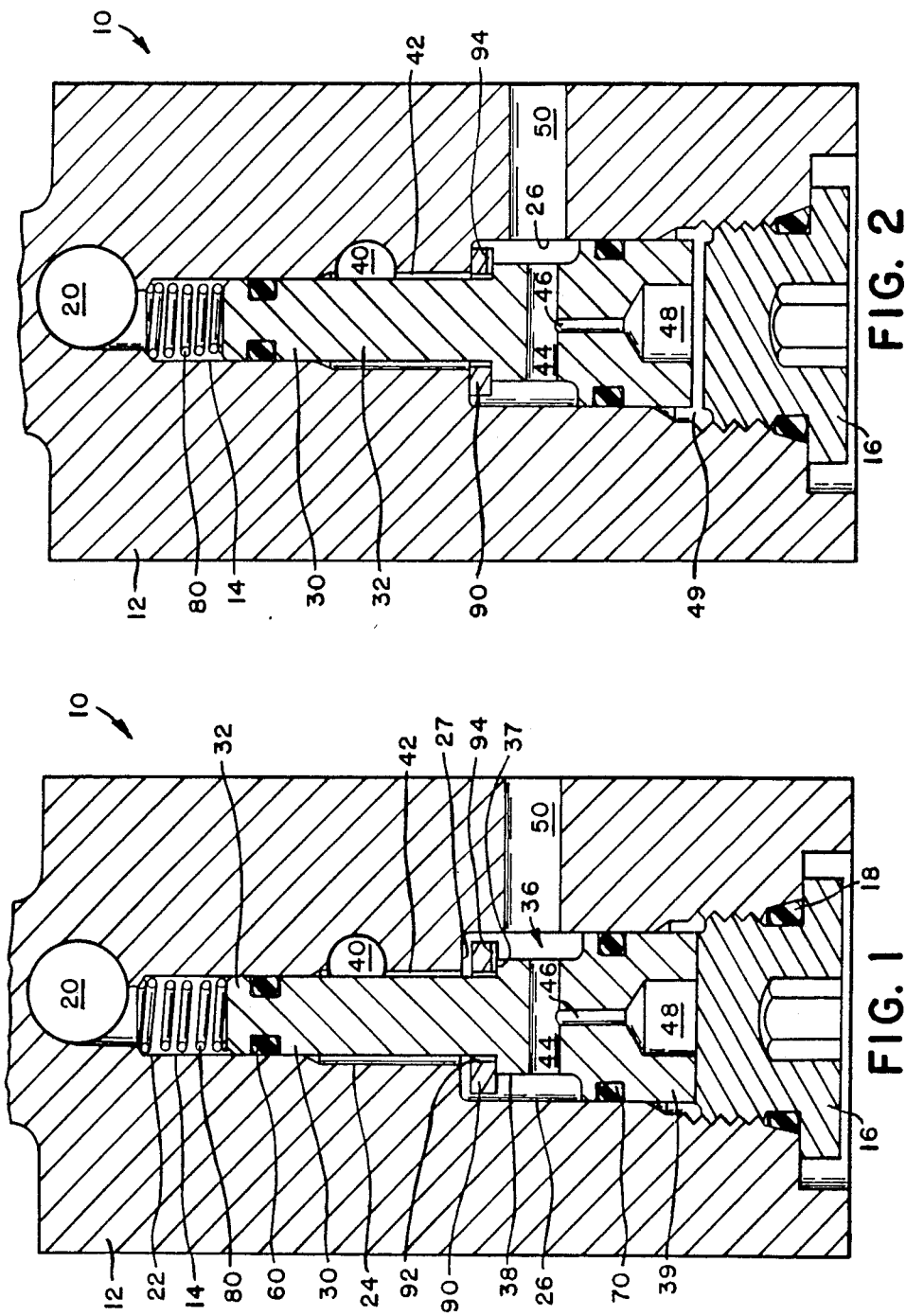

SHUTTLE VALVE WITH SPIKE-APPLY DAMPING

The present invention relates generally to a shuttle valve with spike-apply damping, and in particular to a shuttle valve for an anti-lock braking system.

Shuttle valves utilized with solenoids are illustrated in Brown U.S. Pat. No. 4,620,565 and Martinic U.S. Pat. No. 4,844,119. In many vehicle anti-lock braking systems, there is need for a mechanism which prevents the premature full travel of the shuttle valve during a spike-apply of the brakes. When a vehicle operator suddenly slams on the brakes and effects such a spike-apply of the master cylinder and brake fluid pressure, it is necessary that the high fluid pressure be communicated initially to the brakes, and thereafter the shuttle valve may be displaced and the anti-lock braking system will operate to prevent skidding. If the shuttle valve is permitted to experience full travel during the spike-apply of the brakes, then the high pressure brake fluid will be prevented initially from reaching the brakes and the braking effect desired by the vehicle driver will not be attained. Thus, it is highly desirable to provide an anti-lock braking system shuttle valve which includes a mechanism for preventing the premature full travel of the shuttle valve during spike applications of the braking system.

The present invention provides a solution to the above problem by disclosing a shuttle valve having spike-apply damping, comprising a valve body having therein a stepped bore, the bore including a small diameter bore section, reduced diameter bore section, and enlarged diameter bore section, the small diameter bore section communicating with a brake line connection, the reduced diameter bore section communicating with an outlet opening and the enlarged diameter bore section communicating with an inlet opening, a valve member disposed within said bore and including a first diameter section received within said small diameter bore section and a second diameter section received slidably within the enlarged diameter bore section, the first and second diameter sections having sealing means thereabout engaging sealingly the small and enlarged diameter bore sections, and the second diameter section including a transverse opening communicating with a longitudinal orifice opening which communicates with a chamber disposed at the second diameter section of the valve member, spring means disposed within said bore and biasing said valve member toward an at-rest position, and a movable orifice member disposed at said first diameter section, the movable orifice member having an orifice therein, so that a sudden communication of high pressure fluid via the inlet opening to the enlarged diameter bore section results in a slightly delayed displacement of the valve member and movable orifice member, the displacement of the valve member and movable orifice member then causing said fluid to be communicated through said orifice and toward said outlet opening.

One way of carrying out the invention is described in detail below with reference to the drawings which illustrate an embodiment in which:

FIG. 1 illustrates the shuttle valve of the present invention during normal braking; and FIG. 2 illustrates the shuttle valve after displacement of the valve.

Referring now to the drawings and in particular to FIG. 1, there is shown a shuttle valve in accordance with the present invention and indicated generally by reference numeral 10, which includes a valve body 12 having a cylindrical stepped bore 14. Bore 14 is closed at one end by threaded cap member 16 and seal 18, while the other end of the stepped bore communicates with a brake feedback line connection 20. Located between cap member 16 and feedback line connection 20 are small diameter bore section 22, reduced diameter bore section 24, and enlarged diameter bore section 26. Reduced diameter bore section 24 communicates with an outlet opening 40 and enlarged diameter bore section 26 communicates with an inlet opening 50. Located within stepped bore 14 is a valve member 30 comprising first a diameter section 32 and a second diameter section indicated generally by reference numeral 36. Second diameter section 36 includes a narrowed diameter section 38 and a large diameter section 39. First diameter section 32 has a radius smaller than the radius of reduced diameter bore section 24 so that fluid may flow between inlet opening 50 and outlet opening 40 via a clearance 42. First diameter section 32 includes thereabout a seal 60 and second diameter section 36 includes thereabout a seal 70. Spring 80 located in small diameter bore section 22 biases valve member 30 toward engagement with the cap member 16, the position of valve member 30 in FIG. 1 illustrating an "at-rest" or "open" position. Second diameter section 36 includes a transverse opening 44 which communicates with a longitudinal orifice opening 46 that leads to chamber 48 disposed adjacent cap member 16.

Disposed about first diameter section 32 is a movable orifice member 90 which comprises an annular member having a central opening 92 receiving first diameter section 32. Movable orifice member 90 includes a radially extending slot or orifice 94. First diameter section 32 and second diameter section 36 define shoulder 37 upon which rests the movable orifice member 90. Reduced diameter bore section 24 and enlarged diameter bore section 26 define a bore shoulder 27 which is located a distance apart from the movable orifice member 90. Central opening 92 has a larger diameter than first diameter section 32 so that movable orifice member 90 is freely movable about first diameter section 32 and can translate between the shoulders 27, 37.

In an anti-lock braking system utilizing the shuttle valve of the present invention, braking fluid pressure is received from the master cylinder via inlet opening 50 and communicated through enlarged diameter bore section 26, reduced bore section 24, and transmitted via outlet opening 40 toward a build/decay solenoid valve which then transmits the fluid pressure to a brake. The brake includes the feedback line connection 20 which communicates with one end of bore 14 so that valve member 30 experiences thereacross a pressure differential necessary for shuttle operation. During normal braking, brake pressure is transmitted though inlet opening 50 to outlet opening 40 via bore 14. The pressurized fluid is transmitted around movable orifice member 90 so that it passes between shoulder 27 and member 90, into clearance 42, and exits outlet opening 40. In the event of a spike-apply of the braking system by the vehicle operator wherein the vehicle operator slams his foot upon the brake pedal, there is the sudden communication of very high braking pressure through inlet opening 50 and toward the outlet opening 40. It is necessary for the high pressure to be communicated to the vehicle brakes for a certain period of time so that the vehicle operator experiences a corresponding amount of initial braking response, after which the shuttle valve may then advantageously restrict the communication of the spike-applied, high braking pressure as the anti-lock braking system assists braking so that skidding is prevented. In order to prevent the premature full travel displacement of valve member 30 during such a spike-apply of the brakes, valve member 30 receives the sudden communication of high braking pressure via the transverse opening 44 and then restricts fluid flow through longitudinal orifice opening 46 to chamber 48. By restricting the high pressure fluid flow through longitudinal orifice opening 46 to chamber 48, there is provided a slight delay in the displacement of valve member 30 which occurs as pressure in chamber 48 increases to the extent that valve member 30 experiences a pressure differential between chamber 48 and brake feedback line connection 20. Once the delay in shuttling displacement has been experienced and the pressure in chamber 48 (acting upon second diameter section 36 which is larger than first diameter section 32) increases, valve member 30 will be displaced to the position illustrated in FIG. 2. Chamber 48, second diameter section 36, seal 70, bore 14, and cap member 16 define a variable volume chamber 49. In FIG. 2, shuttle valve member 30 has moved upwardly so that movable orifice member 90 is now trapped between shoulders 27 and 37. As a result, fluid communication between inlet opening 50 and outlet opening 40 now must pass through the orifice opening 94 which greatly restricts pressurized fluid flow. Thus, after an initial delay in the displacement of the shuttle valve so that high pressure fluid from the spike-apply is permitted to be communicated to a brake of the vehicle, the shuttle valve then moves to the position illustrated in FIG. 2 wherein the movable orifice member restricts pressurized fluid communication with the associated brake. By this time, the anti-lock braking system is operative so that skidding of the vehicle is prevented. During anti-lock braking system operation, the shuttle valve is in the displaced position shown in FIG. 2 wherein communication of fluid pressure continues to be through inlet opening 50, enlarged diameter bore section 26, movable orifice opening 94, clearance 42, and outlet opening 40. When anti-lock braking system operation terminates, or when the spike-apply application of the brakes has terminated, the shuttle valve will return toward the at-rest position shown in FIG. 1. Because the movable orifice member 90 is freely movable between shoulders 27 and 37 and also laterally about first diameter section 32, the movement of member 90 in combination with the backflow of fluid effects a washing or flushing of any contaminates or buildup of material at movable orifice opening 94. A common problem experienced by fixed orifices is that a buildup of contaminant material in the brake fluid may eventually cause clogging of the fixed orifice. Movable orifice member 90 eliminates this problem by having orifice opening 94 disposed within a movable member so that the movement and flow of fluid thereabout will effect continually a flushing or cleansing of the orifice, and thereby prevent any buildup of material which could cause clogging of the orifice.

The shuttle valve of the present invention provides a solution to the spike-apply caused premature full travel of a shuttle valve of an anti-lock braking system. The shuttle valve not only provides the desired delay of displacement of the shuttle valve, but also provides a desired restriction of fluid flow after displacement and during anti-lock braking system operation. Additionally, it provides a self-cleansing or flushing of the orifice opening which obviate the clogging problems so commonly experienced by fixed orifices. The shuttle valve of the present invention is particularly useful within anti-lock braking systems where shuttle valves may be utilized in combination with solenoid valves that isolate, build, and decay fluid pressure being communicated with a brake of the vehicle. Typically, the anti-lock braking system may include a number of shuttle valves, such as one shuttle valve for each of the brakes or fewer shuttle valves if two of the brakes are connected and operated in common.

We claim:

1. A shuttle valve having spike-apply damping, comprising a valve body having therein a stepped bore, the bore including a small diameter bore section, reduced diameter bore section, and enlarged diameter bore section, the small diameter bore section communicating with a brake line connection, the reduced diameter bore section communicating with an outlet opening and the enlarged diameter bore section communicating with an inlet opening, a valve member disposed within said bore and including a first diameter section received within said small diameter bore section and a second diameter section received slidably within the enlarged diameter bore section, the first and second diameter sections having sealing means thereabout engaging sealingly the small and enlarged diameter bore sections, and the second diameter section including a transverse opening communicating with a longitudinal orifice opening which communicates with a chamber disposed at the second diameter section of the valve member, spring means disposed within said bore and biasing said valve member toward an at-rest open position, and a movable orifice member disposed at said first diameter section, the movable orifice member having an orifice therein, so that a sudden communication of high pressure fluid via the inlet opening to the enlarged diameter bore section results in a slightly delayed displacement of the valve member and movable orifice member, the displacement of the valve member and movable orifice member then causing said fluid to be communicated through said orifice and toward said outlet opening.

2. The shuttle valve in accordance with claim 1, wherein the reduced diameter bore section has a larger radius than said first diameter section so that fluid flows between said first diameter section and reduced diameter bore section and to the outlet opening.

3. The shuttle valve in accordance with claim 1, wherein the movable orifice member comprises an annular member disposed about said first diameter section, the orifice comprising a radial slot disposed in one surface of the annular member.

4. The shuttle valve in accordance with claim 3, wherein the first and second diameter sections include a valve shoulder therebetween and the reduced and enlarged diameter bore sections include a bore shoulder therebetween, the movable orifice member disposed between said shoulders.

5. The shuttle valve in accordance with claim 4, wherein said movable orifice member includes a central opening through which extends the first diameter section, the first diameter section having a radius smaller than the radius of said central opening.

6. The shuttle valve in accordance with claim 5, wherein the movable orifice member may move between said shoulders when said valve member is in an at-rest position.

7. The shuttle valve in accordance with claim 6, wherein the movable orifice member is displaced with the shuttle valve during the displacement and is captured between the shoulders so that said fluid is communicated through said orifice.

8. The shuttle valve in accordance with claim 1, wherein an end of the bore opposite the small diameter bore section is closed by a cap member.

9. The shuttle valve in accordance with claim 8, wherein the chamber at the second diameter section of the valve member increases in volume as the valve member is displaced toward the line connection.

10. The shuttle valve in accordance with claim 9, wherein the chamber, second diameter section, sealing means, stepped bore, and cap member define a variable volume chamber.

11. The shuttle valve in accordance with claim 1, wherein the line connection is a brake feedback line connection.

12. The shuttle valve in accordance with claim 1, wherein the spring means is disposed in the small diameter bore section.

* * * * *